United States Patent [19]

Rohrlach et al.

[11] Patent Number: 5,073,318
[45] Date of Patent: Dec. 17, 1991

[54] VEHICLE INNER PANEL

[75] Inventors: Milo L. Rohrlach, North Brighton; William J. Hall, Eden Hills, both of Australia

[73] Assignee: Bridgestone Australia Ltd., Edwardstown, Australia

[21] Appl. No.: 413,286

[22] Filed: Sep. 27, 1989

[30] Foreign Application Priority Data

Sep. 27, 1988 [AU] Australia ............................. PJ0617
Nov. 24, 1988 [AU] Australia ............................. PJ1606

[51] Int. Cl.5 ............................................ B29C 67/22
[52] U.S. Cl. .................................. 264/46.5; 264/46.7; 264/138; 264/255; 264/257; 264/309
[58] Field of Search ................ 264/46.5, 46.4, 46.7, 264/138, 257, 309, 255; 156/78; 296/37.13, 39.1

[56] References Cited

U.S. PATENT DOCUMENTS

| 2,217,137 | 10/1940 | Roth et al. | |
|---|---|---|---|
| 3,879,240 | 4/1975 | Wall | 264/46.5 |
| 4,214,788 | 7/1980 | Srock | 296/39.1 |
| 4,268,557 | 5/1981 | Bracesco | 264/46.7 |
| 4,381,908 | 5/1983 | Roth | 264/46.4 |
| 4,420,447 | 12/1983 | Nakashima | 264/46.4 |
| 4,455,340 | 6/1984 | Okina | 428/318.6 |
| 4,474,635 | 10/1984 | Adams | 264/257 |
| 4,525,231 | 6/1985 | Wnuk | 264/46.4 |
| 4,544,126 | 10/1985 | Melchert | 264/46.7 |
| 4,766,025 | 8/1988 | Sanok et al. | 264/46.6 |
| 4,810,452 | 3/1989 | Taillefert et al. | 264/46.4 |
| 4,863,654 | 9/1989 | Belleville et al. | |

FOREIGN PATENT DOCUMENTS

| 265313 | 4/1988 | European Pat. Off. | |
|---|---|---|---|
| 54-058769 | 5/1979 | Japan | 264/46.5 |
| 57-059731 | 4/1982 | Japan | 264/46.5 |
| 0898242 | 6/1962 | United Kingdom | 264/46.5 |

Primary Examiner—Robert A. Dawson
Assistant Examiner—Allan R. Kuhns
Attorney, Agent, or Firm—Darby & Darby

[57] ABSTRACT

A substrate is initially moulded from a cross-linked polymeric material reinforced with glass fibres, the substrate is subsequently placed in a die in which a facing layer is first moulded, and on that layer are injected the ingredients for a foam padding material which adhere the substrate to the facing layer. The facing layer is desirably polyurethane, although use can be made of flexible acrylic, polyvinylchloride, and some other polymeric materials.

9 Claims, 4 Drawing Sheets

VEHICLE INNER PANEL

This invention relates to an inner panel for the trim of a motor vehicle and to its method of manufacture, for example, the inner door panel. The method however is applicable to other motor vehicle inner panels.

BACKGROUND OF THE INVENTION

At the present time inner door panels are produced utilizing a substrate made from either pressed lignocellulose fibers, phenolic bonded fabric fibers or a thermoplastic polymer. To this substrate a PVC film is usually stapled with foam padding being incorporated by fabrication. These operations are time consuming and the end product is sometimes unsatisfactory because of dimensional instability, impact failure, severe fogging of glass surfaces in a vehicle, and discoloration when parts are subjected to high humidity and high temperature service conditions.

Another problem which is encountered is the attachment to the substrate of a flocked rubber belt line section which bears against the inner surface of the glass panel of the door.

PRIOR ART

The closest prior art known to the applicant is the European Application 0 265 313 in the name of AUTOMOBILES PEUGEOT, wherein fabric and carpet were first retained in a mold by application of vacuum, part of the mold, together with the fabric and carpet, was masked, one color elastomer was sprayed, a substrate positioned, edges returned over the substrate where required, and soft foam-forming chemicals were injected.

Other prior art thought to be relevant comprises the U.S. Pat. No. 4,455,340 TOYOHIKO OKINA, wherein a molded foam comprises a surface layer of elastomeric thin film, an intermediate reinforcing layer of elastic film, and a core layer.

No prior art is known wherein a substrate is affixed to one die part of a two-part die set, elastomer sprayed onto the other die part, foam-forming chemicals applied, and the die parts closed during foaming.

BRIEF SUMMARY OF THE INVENTION

In this invention a substrate is initially molded from a cross-linked polymeric material reinforced with glass fibers, the substrate is subsequently placed in a die in which a facing layer is first molded, and on that layer are injected the ingredients for a foam padding material which adhere the substrate to the facing layer. The facing layer is desirably polyurethane, although use can be made of flexible acrylic, polyvinylchloride, and some other polymeric materials.

Sometimes it is desirable to utilize small panels for example of carpet material or of fabric material and in the invention, carpet or fabric material can be cemented to the facing surface of the molded substrate, and the padding material is molded over the remainder of the substrate. Alternatively, it can be cemented to the facing layer.

More specifically, the invention consists of a method of manufacture of a motor vehicle inner panel, comprising the following steps:
(a) locating reinforcing fibers on one die part of a first two-part die set, applying moldable plastics material on that die part,
(b) closing the die set and retaining it closed during a molding process of the plastics material, set, and removing a molded substrate
(c) opening the die set, and removing a molded substrate comprising the plastics material reinforced by the fibers,
(d) spraying an elastomer into one die part of a second two-part die set, curing the elastomer to form a facing layer of the panel, applying moldable foam-forming plastics material over at least part of the facing layer, positioning the molded substrate into the second die set, closing the second die set and retaining closed during a foaming and molding process of the facing layer, and
(e) removing the panel from the second two-part die set, and trimming superfluous material from the panel.

BRIEF SUMMARY OF THE DRAWINGS

An embodiment of the invention is described hereunder in some detail with reference to, and is illustrated in, the accompanying drawings, in which.

Figure 1:
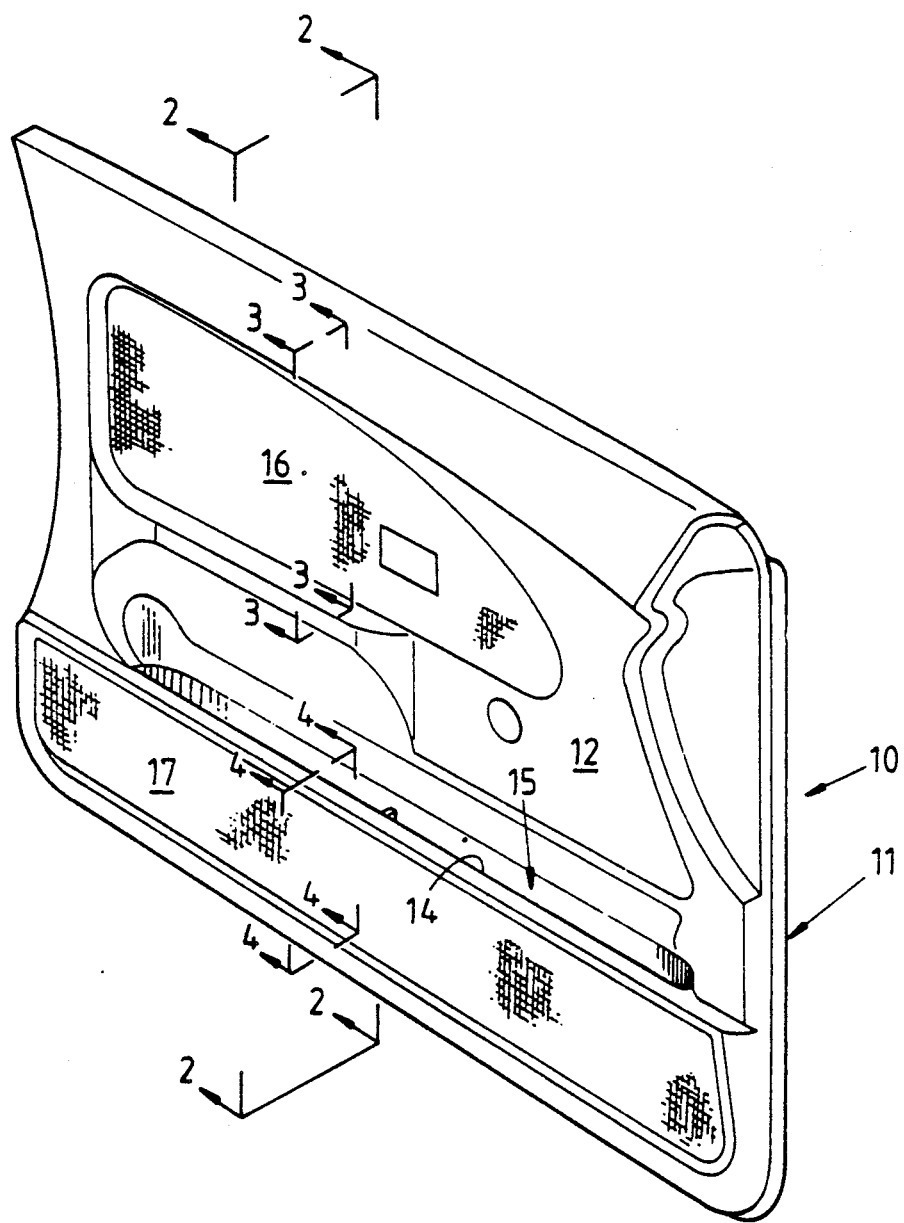
FIG. 1 is a perspective view of a door inner panel.
Figure 2:
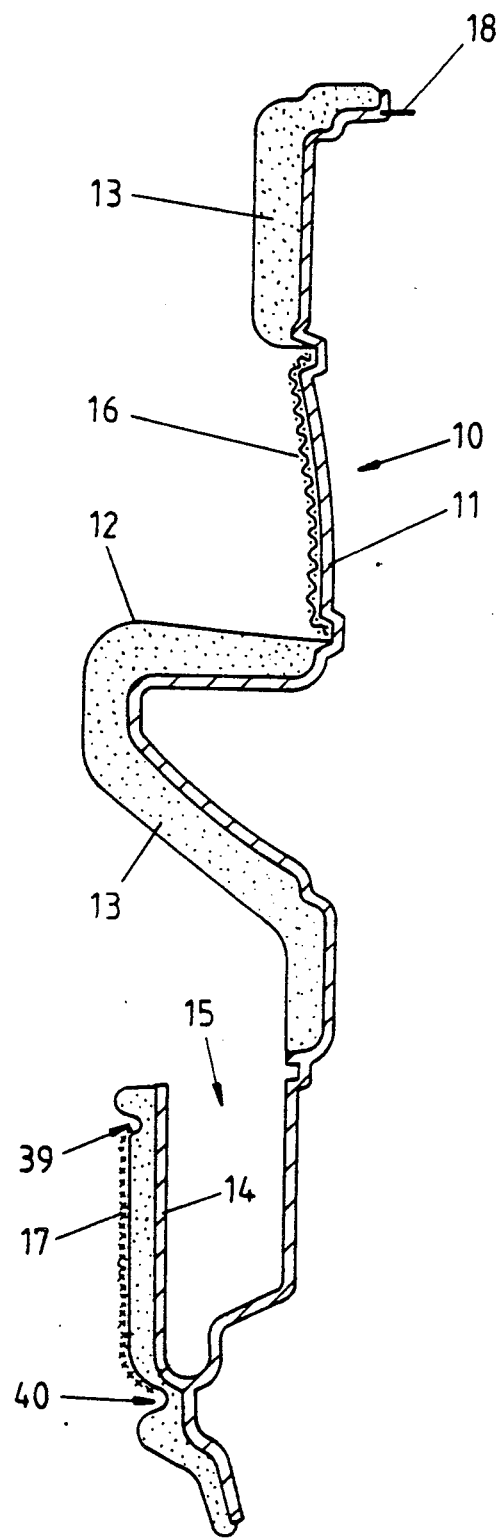
FIG. 2 is a section on plane 2—2—2—2 of FIG. 1.
Figure 3:
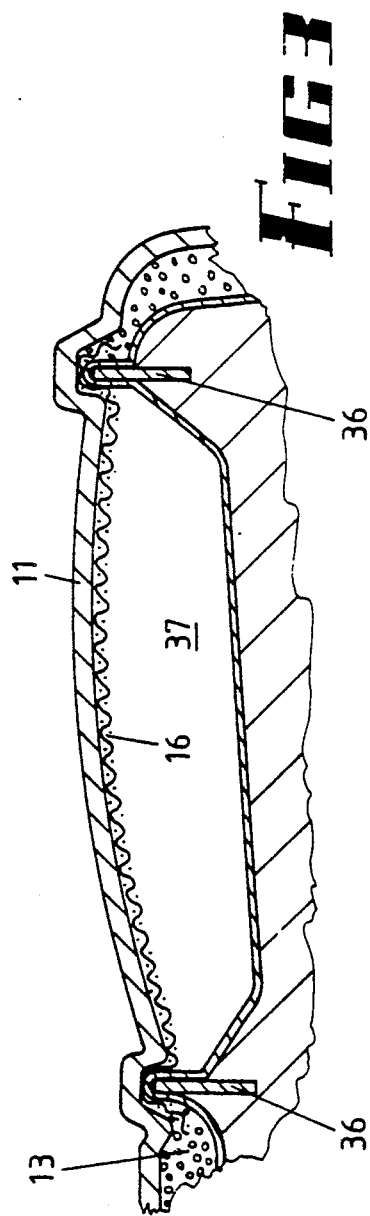
FIG. 3 is a fragmentary section taken on plane 3—3—3—3 of FIG. 1, drawn to a larger scale, and showing the molding means at that locality.

In this embodiment, a door inner panel 10 of a motor vehicle comprises a substrate 11 of rigid polyurethane foam reinforced with glass fibers, an elastomeric facing layer 12 of flexible polyurethane, and an intermediate layer of soft resilient polyurethane foam 13 between the facing layer 12 and the substrate 11 which extends sufficiently over the area of the panel to adhere the facing layer 12 to the substrate 11. A pocket wall 14 defines with the substrate 11 a pocket 15.

For aesthetic purposes, a panel 16 of fabric is adhered to the substrate 11, and the panel 17 of carpet material is adhered to the facing layer 12 at the locality of the pocket wall 14. To assist in providing attachment means for a belt line section, there is provided a metal strip 18 which extends along at least part of the length of the panel 10 at its upper edge and is embodied in the molding of the substrate 11.

Figure 5:
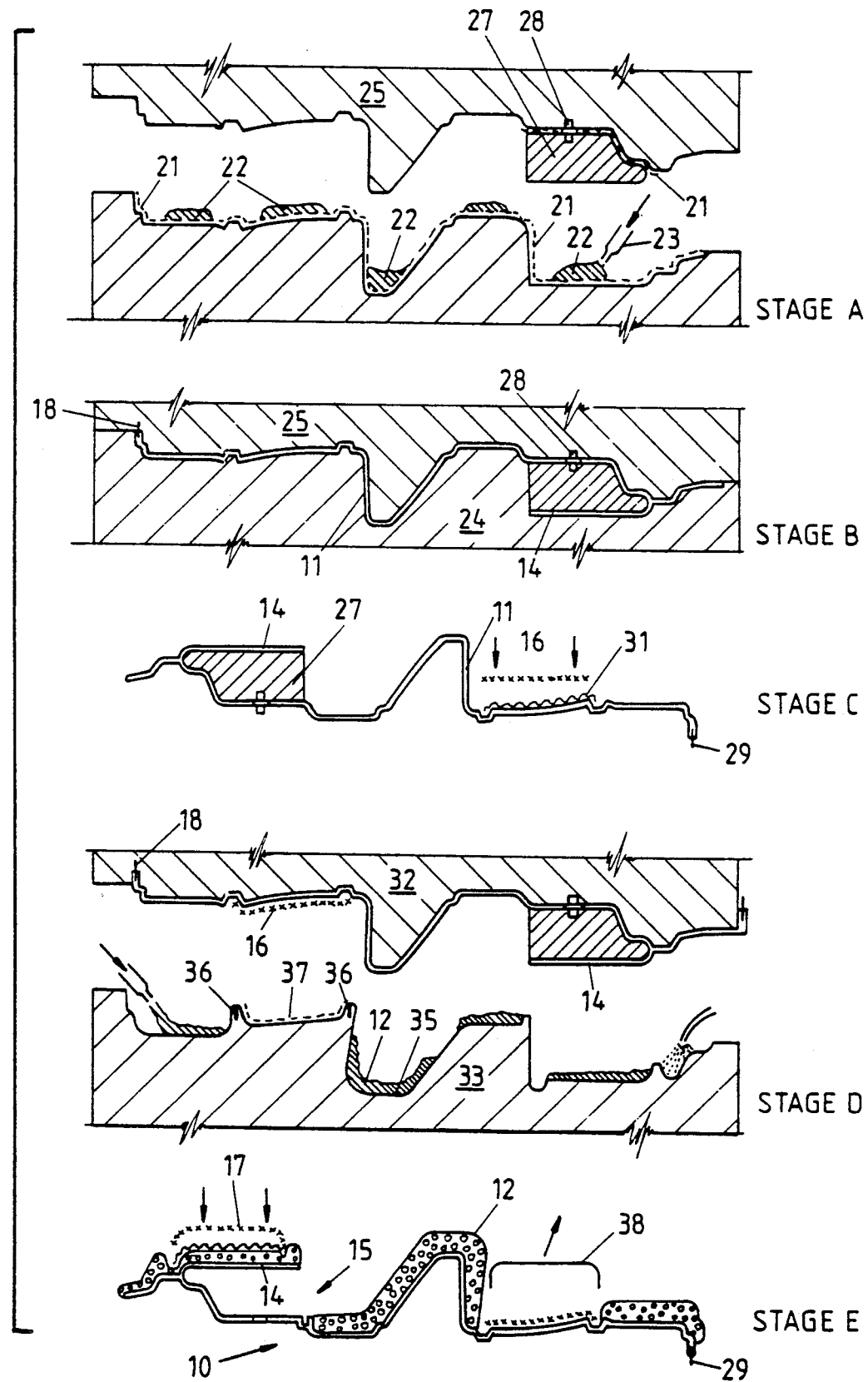
FIG. 5 is a diagrammatic representation of stages of manufacture.

Reference is now made to FIG. 5 which illustrates the method of production.

In FIG. 5, Stage A shows the laying of glass reinforcing fibers 21, in the form of a sheet of continuous filament glass, although other fibrous reinforcement may be used, such as chopped strand mat, or lignocellulose material. Over this is poured a quantity of moldable plastics material 22 from a pouring device 23. The material used for the substrate is a two pot mix of polyurethane which Will react to form a cross-linked polyurethane substrate 11. Polyesters, either cellular or dense, or other appropriate materials may encapsulate or otherwise bind the selected fibrous or lignocellulose material. Alternatively, the substrate may be of thermoplastic polymer, e.g. wood dust filled polypropylene or phenolic bonded fabric fibers.

Figure 4:
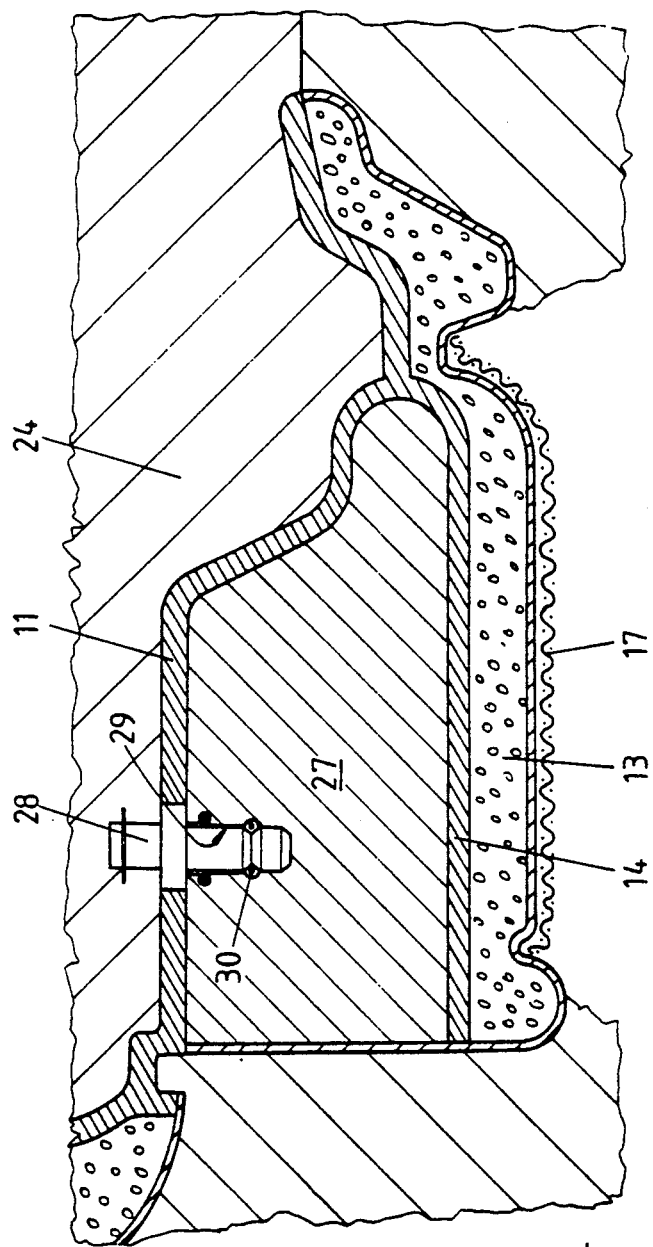
FIG. 4 is a fragmentary section taken on plane 4—4—4—4 of FIG. 1, also drawn to a larger scale, and showing molding means at that locality.

In order to form pocket 15, use is made of a pocket forming plug 27 which is temporarily affixed to upper die part 25 of the first die set by a pair of flanged pins 28 projecting from the upper die part, and sealably engaging in apertures 29 and retained in place by resilient spring rings 30 (FIG. 4). Some glass reinforcement fiber 21 is located between plug 27 and upper die part 25.

The lower die part 24 on which the glass reinforcing fibers and moldable material is laid, is initially closed by the upper die part 25 of the first die set and the substrate 26 is at least partly cured before the die parts are again opened. The foaming chemicals partly envelop pocket forming plug 27, flowing both above it, where it lies separated from the upper die part 25 by the flange on pin 28, thus forming the substrate and pocket wall in "one shot".

After the cross-linking has completed, the first die set 24–25 is opened and the substrate 11 together with its pocket wall 14 and plug 27 is removed (Stage C of FIG. 5). The metal strip 29 is molded during Stage A into the upper edge of the substrate 11 to project therefrom.

At this stage the fabric panel 16 is adhered by cement 31 to part of the area of the panel, the substrate is inverted, and positioned in the die part 32 of a second die set 32–33 as shown in Stage D. The lower die part 33 initially is sprayed with a "paint", in the form of an aliphatic polyurethane, polyethylene, flexible acrylic, P.V.C. or other color film forming material. After that, a second layer of polyurethane elastomer is applied (curing to a dense soft polyurethane facing layer 12), and after the facing layer has at least partly cured, foam forming material 35 is placed over the facing layer and the die parts 32 and 33 of the second die set are closed. The die part 33 has some projecting blades 36 which are peripheral around a hollow portion 37 into which the facing layer 12 is molded to form a "blister" and the blades 36 establish a clearly defined edge line between the facing layer 12 and fabric 16.

After the foam forming material 35 has cross-linked into a soft resilient polyurethane foam, it adheres to the facing layer and to the substrate 11 over most of the area of the panel. The die parts 32–33 are opened, the substrate removed, and the blister 38 and any other unwanted material is trimmed away from the panel. At this stage the panel of carpet 17 is adhered to the facing layer on the outer surface of the pocket wall 14. The plug 27 is lifted away from the pocket. The peripheral edge of the carpet panel 17 is urged into recesses 39 and 40 to provide a clearly defined edge line for the carpet panel 17.

The method of this invention provides an inner door panel which is dimensionally stable in all service conditions, it does not fog or discolor, it has high impact resistance, it imposes no styling restrictions, it can incorporate both a map pocket and an integrally molded arm rest, and a metal belt line insert may be encapsulated in the molding operation.

It eliminates some of the high labor content associated with the current fabrication methods and is cost competitive.

The panel is strong and rigid and is considerably lighter than prior ar panels.

Soft padding can be incorporated during molding if required at any selected position over the panel.

Tooling costs are low and the method offers the opportunity to produce prototype parts in a short time. The face surface can be embellished with various types of grain or stitch lines to give the part a very pleasing aesthetic appearance.

We claim:
1. A method of manufacture of a motor vehicle inner panel comprising the following steps:
   (a) locating reinforcing fibers on one die part of a first two-part die set, applying moldable plastics material on that die part,
   (b) closing the die set and retaining it closed during a molding process of the plastics material,
   (c) opening the die set, and removing a molded substrate comprising the plastics material reinforced by the fibers,
   (d) spraying a flexible color film layer into a first die part of a second two-part die set and applying a second layer of elastomer over the first layer, curing the color film and elastomer layers to form a dense, soft facing layer of the panel, positioning the molded substrate into a second die part of the second die set, applying moldable foam-forming plastics material over at least part of the facing layer between the facing layer and the substrate layer, closing the second die set and retaining closed during a foaming and molding process of the facing layer, and
   (e) removing the panel from the second two-part die set, and trimming superfluous material from the panel.

2. A method of manufacturing a door inner panel according to claim 1, further comprising retaining a removable pocket-forming plug to a part of the first two-part die set but spacing the plug from that die part, inserting further reinforcing fibers between the plug and die part, and causing the moldable plastics to partly envelop the pocket-forming plug and define a pocket wall unitary with the molded substrate.

3. A method of manufacturing a door inner panel according to claim 2 comprising retaining the pocket-forming plug to its said one die part by engaging over pins projecting from that die part.

4. A method of manufacturing a door inner panel according to claim 2, comprising removing said plug from a pocket formed thereby in the substrate after step (e) of claim 1.

5. A method according to claim 1, further comprising adhering a fabric panel to a portion of the substrate after step (c) but before step (d) of claim 1.

6. A method according to claim 5, further comprising forming that portion of said elastomeric facing layer which overlies the fabric panel in a plane displaced from the substrate, thereby forming an outstanding blister of facing layer, and removing that blister when trimming superfluous material during step (e) of claim 1.

7. A method according to claim 5, further comprising urging the fabric panel towards the substrate with blades bearing against the fabric panel near its peripheral edges during step (d) of claim 1.

8. A method according to claim 1, further comprising adhering a panel of carpet to a portion of the facing layer after step (e) of claim 1.

9. A method of manufacturing a door inner panel according to claim 1, further comprising locating a metal strip in said first two-part die set before step (b) of claim 1, and molding the substrate over only a portion of the metal strip, leaving sufficient of the metal strip projecting from the substrate to provide attachment means for a belt line.

* * * * *